(12) United States Patent
Kompalli et al.

(10) Patent No.: US 8,965,134 B2
(45) Date of Patent: Feb. 24, 2015

(54) DOCUMENT REGISTRATION

(75) Inventors: Suryaprakash Kompalli, Bangalore (IN); Venkata Gopal Edupuganti, Newark, NJ (US); Vinayak Agarwal, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/110,130

(22) PCT Filed: Apr. 5, 2011

(86) PCT No.: PCT/IN2011/000234
§ 371 (c)(1),
(2), (4) Date: Oct. 4, 2013

(87) PCT Pub. No.: WO2012/137214
PCT Pub. Date: Oct. 11, 2012

(65) Prior Publication Data
US 2014/0029857 A1 Jan. 30, 2014

(51) Int. Cl.
*G06K 9/74* (2006.01)
*G06K 9/00* (2006.01)
*G06K 9/62* (2006.01)

(52) U.S. Cl.
CPC ........ *G06K 9/00456* (2013.01); *G06K 9/00483* (2013.01); *G06K 9/6211* (2013.01)
USPC ........... 382/212; 382/175; 382/190; 382/219; 358/537; 358/538

(58) Field of Classification Search
USPC ........... 382/128, 130, 131, 132; 128/922, 923
See application file for complete search history.

(56) References Cited

U.S. PATENT DOCUMENTS 7,697,785 B2 * 4/2010 Chiu et al. ..................... 382/284
7,738,140 B2 * 6/2010 Hancock et al. ............... 358/1.9
(Continued)

FOREIGN PATENT DOCUMENTS

CN 101308567 A 11/2008
CN 101567051 B 6/2009

OTHER PUBLICATIONS

J. Luo et al., "Face recognition method based on SIFT feature," Computer Engineering, vol. 36, No. 13, Jul. 2010. See WO/ISR for relevance. Translation of at least the abstract is provided.
(Continued)

*Primary Examiner* — Yosef Kassa
(74) *Attorney, Agent, or Firm* — Van Cott, Bagley, Cornwall & McCarthy

(57) ABSTRACT

A method of registering a document comprises, with a processor (150), defining (block 505) a plurality of clusters in an image of a template document (300) by assigning each of a number of feature points of an image of a template document to a cluster with the closest mean, with the processor (150), refining (block 510) a correspondence set of the feature points between the image of the template document (300) and the image of the target document (400) using a histogram of Euclidian distances, and with the processor (150), eliminating (block 515) outliers within a correspondence set of the feature points between the image of the template document (300) and an image of a target document (400) by generating a hypothesis and evaluating the hypothesis a number of iterations, in which the image of the target document (400) is captured by an imaging device (110) from a physical document.

15 Claims, 6 Drawing Sheets

(56) References Cited

U.S. PATENT DOCUMENTS

| | | | |
|---|---|---|---|
| 8,652,070 B2* | 2/2014 | Williams | 600/595 |
| 8,652,071 B2* | 2/2014 | Williams | 600/595 |
| 8,751,616 B2* | 6/2014 | Karklins et al. | 709/223 |
| 8,771,078 B2* | 7/2014 | Miller et al. | 463/42 |
| 8,784,189 B2* | 7/2014 | Miller et al. | 463/25 |
| 2004/0247168 A1 | 12/2004 | Pintsov et al. | |

OTHER PUBLICATIONS

L. Zeng et al., "Automatic matching strategy based on SIFT," Opto-Electronic Engineering, vol. 38, No. 2, Feb. 2011. See WO/ISR for relevance. Translation of at least the abstract is provided.

H. Peng et al., "Document image recognition based on template matching of component block projections," IEEE Transactions on Pattern Analysis and Machine Intelligence, vol. 25, No. 9, Sep. 2003. See WO/ISR for relevance. Reference in English.

Y. Zhu et al., "Document image registration based on geometric invariant and contour matching," IEEE Int'l Conf. on Computational Intelligence & Multimedia Applications (Proceedings thereof), year 2007. See WO/ISR for relevance. Reference in English.

WO/ISR (Written Opinion/International Search Report) of counterpart PCT patent application, PCT/IN2011/000234, dated Oct. 20, 2011.

* cited by examiner

DOCUMENT REGISTRATION

BACKGROUND

Document registration comprises registering an image of a template document comprising a known layout with a target document image. Given the known layout of the template image and the registration parameters, the layout is superimposed on or otherwise compared to a target document. The comparison of the template image and the target document is used to extract regions of interest within the target document that contain information desirable to the user or are utilized for data entry, or document creation, among others. A system employing document registration may utilize a scanning device to obtain scanned documents under affine transformation.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
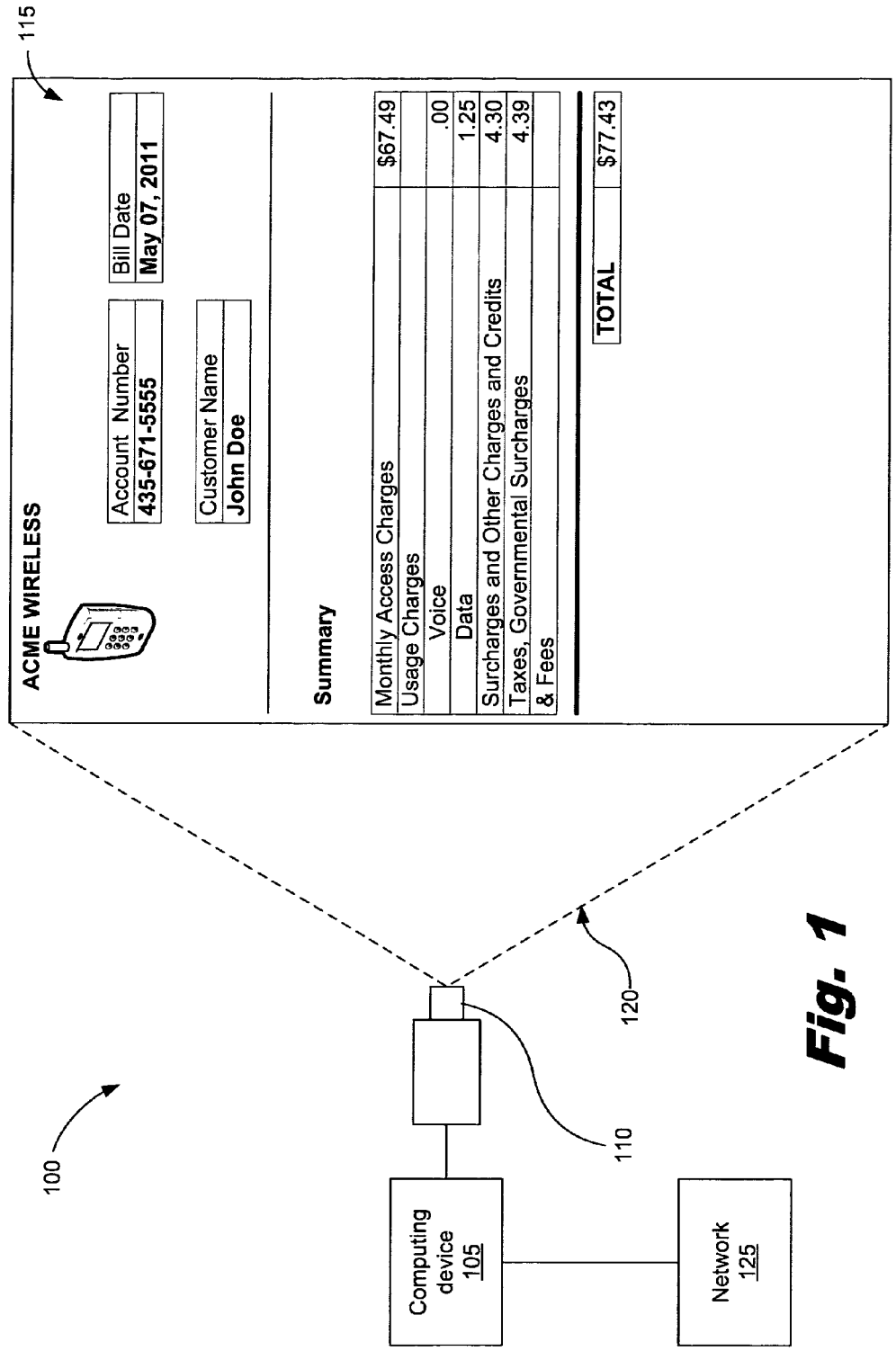
FIG. 1 is a diagram of an illustrative document image registration system, according to one example of the principles described herein.

Digital imaging devices have been proliferated in alternative devices such as mobile phones, and digital cameras in addition to scanning devices. Unlike in a scanner implemented system, document registration does not address camera noise issues that may arise during the use of these alternative digital imaging devices. Camera noise issues in these alternative imaging device may comprise, for example, non-uniform lighting, background cluttering or occlusion by objects like other documents or the hands of a user, perspective distortions or skew, and highly variable scale and resolution. Further, the absence of a scan bed in capturing images using these alternative digital imaging devices also leads to non-planar deformations within the digital images caused by creases, folds, and wrinkles in the paper being imaged. This camera noise makes it more difficult or impossible to register an image of a document.

Still further, document registration uses a learning system wherein multiple samples are used during training. This is the phase in document registration where a computing device creates a model of the location of the regions within a document that are of interest in data extraction. However, providing several such training images is an inconvenience for a user.

The present specification discloses systems and methods of aligning an image of a template document with an image of a target document, registering the images, and extracting desired data from the image of the target document. The systems and methods of the present specification provide for the data extraction to occur evening images of target documents that are captured by mobile phone cameras and other digital imaging devices. This can be accomplished through the use of (1) histogram based uniformly transformed correspondence estimation, (2) clustering of points located near the regions of interest (ROI) to select close by regions for matching, and (3) validation of the registration using an enhanced RANSAC and an enhanced TPS-RPM methods for non-rigid registration.

As used in the present specification and in the appended claims, the terms "template image" or "image of a template document" are meant to be understood broadly as any set of data that represents a template document. Further, as used in the present specification and in the appended claims, the terms "target image," or "image of a target document" are meant to be understood broadly as any set of data that represents a target document; a hardcopy or physical document captured by a digital imaging device and from which data is to be extracted.

Further, as used in the present specification and in the appended claims, the terms "region of interest," "ROI," or similar language is meant to be understood broadly as any subset of image data within an image identified for data extraction. In one example, the region of interest is defined in the template image and extracted from the target image. Once extracted from the target image, the data contained within the region of interest may be utilized. For example, the data may be utilized to auto-populate a form, confirm a reservation, search for information relating to the data, and archive the data, among others.

Still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of an illustrative document image registration system (100), according to one example of the principles described herein. The document image registration system (100) comprises a computing device (105) and a digital imaging device (110). The digital imaging device (110) captures images of a document (115) as indicated by the dashed line (120). The computing device (105) is also communicatively coupled to a network (125). Each of these elements will not be described in more detail below.

In the present example, for the purposes of simplicity in illustration, the computing device (105) and the digital imaging device (110) are separate elements communicatively coupled to each other. However, the principles set forth in the present specification extend equally to alternative examples within the scope of the principles of the present specification including, but not limited to, examples in which the computing device (105) and the digital imaging device (110) are implemented by the same device such as, for example, a mobile phone, a smart phone, and a digital camera, among others. Further, the principles set forth in the present specification extend equally to alternative examples within the scope of the principles of the present specification including examples in which the functionality of the computing device (105) is implemented by multiple interconnected computers, for example, a server in a data center and a user's client machine, and examples in which the computing device (105) and the digital imaging device (110) communicate directly through a bus without intermediary network devices.

Figure 2:
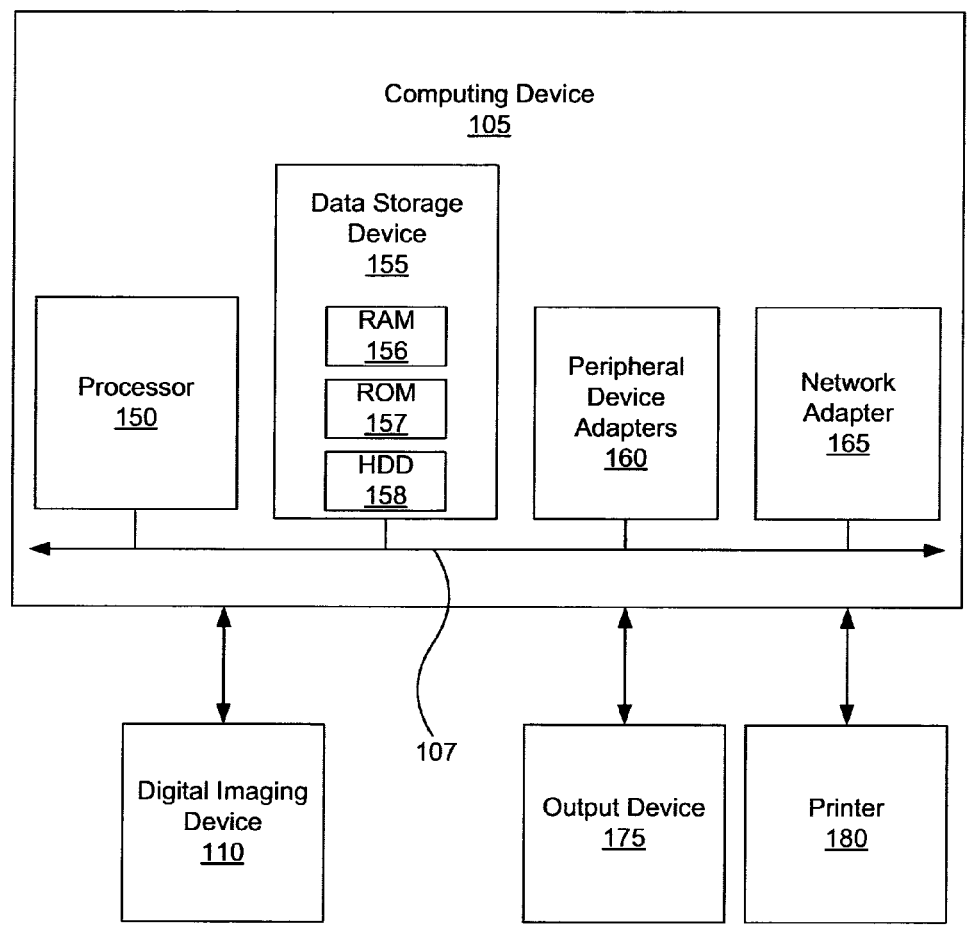
FIG. 2 is a diagram of the computing device of the document image registration system of FIG. 1, according to one example of the principles described herein.

In order to describe the computing device (105) in detail, FIG. 2 is a diagram of the computing device (105) of the document image registration system (100) of FIG. 1, according to one example of the principles described herein. The computing device (105) of the present example retrieves digital image data from a data source such as, for example, the digital imaging device (110), registers images of a template document and a target document, compares the images, and extracts regions of interest as will be described in more detail below. In the present example, this is accomplished by the computing device (105) requesting the image data captured by the digital imaging device (110). In another example, the computing device (105) requests image data contained within a data storage device (155) after the digital imaging device (110) captures an image of the documents, and the data representing those document images are stored in the data storage device (155).

To achieve its desired functionality, the computing device (105) includes various hardware components. Among these hardware components may be at least one processor (150), at least one data storage device (155), peripheral device adapters (160), and a network adapter (165). These hardware components may be interconnected through the use of one or more busses and/or network connections. In one example, the processor (150), data storage device (155), peripheral device adapters (160), and network adapter (165) may be communicatively coupled via bus (107).

The processor (150) may include the hardware architecture for retrieving executable code from the data storage (155) and executing the executable code. The executable code may, when executed by the processor (150), cause the processor (150) to implement at least the functionality of registering images of a template document and a target document, comparing the images, and extracting regions of interest. In the course of executing code, the processor (150) may receive input from and provide output to one or more of the remaining hardware units.

In one example, the computing device (105), and, specifically, the processor (150) accesses image data within the database (155) as captured and retrieved from the digital imaging device (110), registers the images, places the layout of the template image on the target image, extracts regions of interest, and presents the data contained within the regions of interest to a user via an output device (175). In another example, the processor (150) utilizes the data contained within the regions of interest. For example, the processor may utilized the extracted data in order to provide a user with additional information regarding the extracted data, populate a form such as a bill payment form or a reservation form, and archive the extracted data.

The processor (150), in one example, presents to the user with a user interface on the output device (175). The output device (175) may be any number of devices that provide a representation of, for example, the registered documents, extracted data, forms into which the extracted data is incorporated, or other user interfaces to a user. In one example, the output device (175) is a display device such as a cathode ray tube, a plasma display, or a liquid crystal display, among others.

The data storage device (155) may store data that is processed and produced by the processor (150) and the digital imaging device (110). The data storage device (155) may include various types of memory modules, including volatile and nonvolatile memory. For example, the data storage device (155) of the present example includes random access memory (RAM) (156), read only memory (ROM) (157), and a hard disk drive (HDD) (158) memory. Many other types of memory may be employed, and the present specification contemplates the use of many varying type(s) of memory in the data storage device (155) as may suit a particular application of the principles described herein. In certain examples, different types of memory in the data storage device (155) may be used for different data storage needs. For example, in certain examples the processor (150) may boot from ROM (157), maintain nonvolatile storage in the HDD (158) memory, and execute program code stored in RAM (156).

Generally, the data storage device (155) may comprise a computer readable storage medium. For example, the data storage device (155) may be, but not limited to, an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device such as, for example, the processor (150). In another example, a computer readable storage medium may be any form of non-transitory computer readable medium. The term computer readable storage medium does not include transmission media, such as an electronic signal per se The peripheral device adapters (160) and network adapter (165) in the computing device (105) enable the processor (150) to interface with various other hardware elements, external and internal to the computing device (105). For example, peripheral device adapters (160) may provide an interface to input/output devices, such as, for example, output device (175). The peripheral device adapters (160) may also create an interface between the processor (150) and a printer (180) or other media output device. For example, where the computing device (105) registers images of a template document and a target document, compares the images, and extracts regions of interest, and the user then wishes to utilize the extracted data in, for example, filling a form and print the filled form, the computing device (105) may instruct the printer (180) to create one or more physical copies of the filled form.

A network adapter (165) may additionally provide an interface to the network (125), thereby enabling the transmission of the extracted data to other devices on the network (125), including a database. Further, in another example, the user may utilize the extracted data in filling in a form on a webpage. In one example, the network (125) may comprise two or more computing devices communicatively coupled. For example, the network (125) may include a local area network (LAN), a wide area network (WAN), a virtual private network (VPN), and the Internet, among others.

Turning again to FIG. 1, the digital imaging device (110) may be any device that captures images. As described above, the digital imaging device (110) may be, for example, an imaging device coupled with or incorporated into a mobile phone or smart phone, a webcam, an office camera such as those developed by Pathway Innovations and Technologies, Inc. and commercially sold as HoverCam®, or a digital camera, among others. However, the digital imaging device (110) may also be a handheld scanning device or a scanning device that incorporates a scanning bed.

Figure 3:
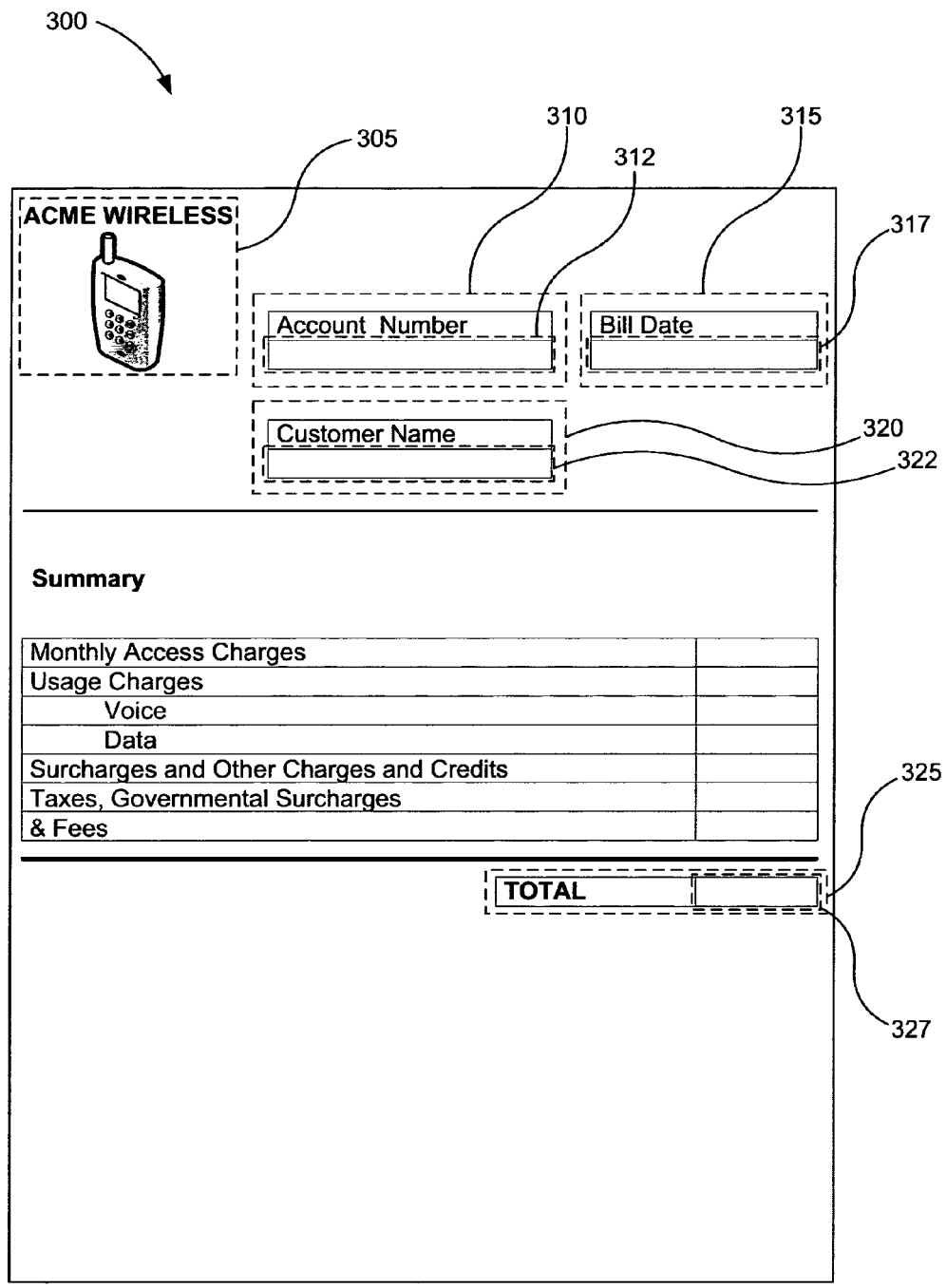
FIG. 3 is a diagram of an illustrative image of a template document, according to one example of the principles described herein.

In connection with the imaged document (115) of FIG. 1, and turning now to FIG. 3, a diagram of an illustrative image of a template document (300), according to one example of the principles described herein, is depicted. In the present example, the image of the template document (300) is a wireless phone bill. However, the template document of which the image is captured may be any type of document from which a user may benefit from extracting specific content. For example, the template document may be a bill for goods or services issued to a user, a reservation receipt or confirmation printout, a tax document, or a bank receipt, among others.

The image of the template document (300) comprises a number of regions of interest (ROI) (305, 310, 315, 320, 325). As defined above, a region of interest is a subset of image data within an image identified for data extraction. In the present example, the ROI may comprise a logo or trademark region of interest (305), an account number region of interest (310), a bill date region of interest (315), a customer name region of interest (320), and a total bill amount region of interest (325). However, the various ROI (305, 310, 315, 320, 325) within an image of a template document (300) may include other ROI such as, for example, a reservation number region of interest, a flight number region of interest, a train platform number region of interest, a train number region of interest, a confirmation number region of interest, and a shipped package tracking number region of interest, among others. In one example, the image of the template document (300) may comprise a filled in document in which the various data fields include data such as, for example, an account number within the ROI (305, 310, 315, 320, 325). In another example, the image of the template document (300) may comprise an unfilled document in which the various fields within the fields contain no specific information as depicted in FIG. 3 and in contrast to the target document (400) of FIG. 4.

Data associated with the image of the template document (300) may be provided from various sources. In one example, the template document image data may be provided from a goods or services provider. In this example, the goods or services provider provides data defining the template document to, for example, the computing device (105) via the network (125). In this example, the computing device (105) may use the template document image data to identify ROI (305, 310, 315, 320, 325) within the image of the template document (300), or the data defining the template document as provided by the goods or services provider may indicate which portions of the template document are to be considered ROI. In another example, the source of template document image data may be the digital imaging device (110). In this example, an image of the template document (300) is captured by the digital imaging device (110), and stored in the data storage device (155) for comparison with an image of a target document (400). In yet another example, a user may interface with the computing device (105), and indicate within the image of the template document (300), what portions of the image of the template document (300) are ROI (305, 310, 315, 320, 325).

Figure 4:
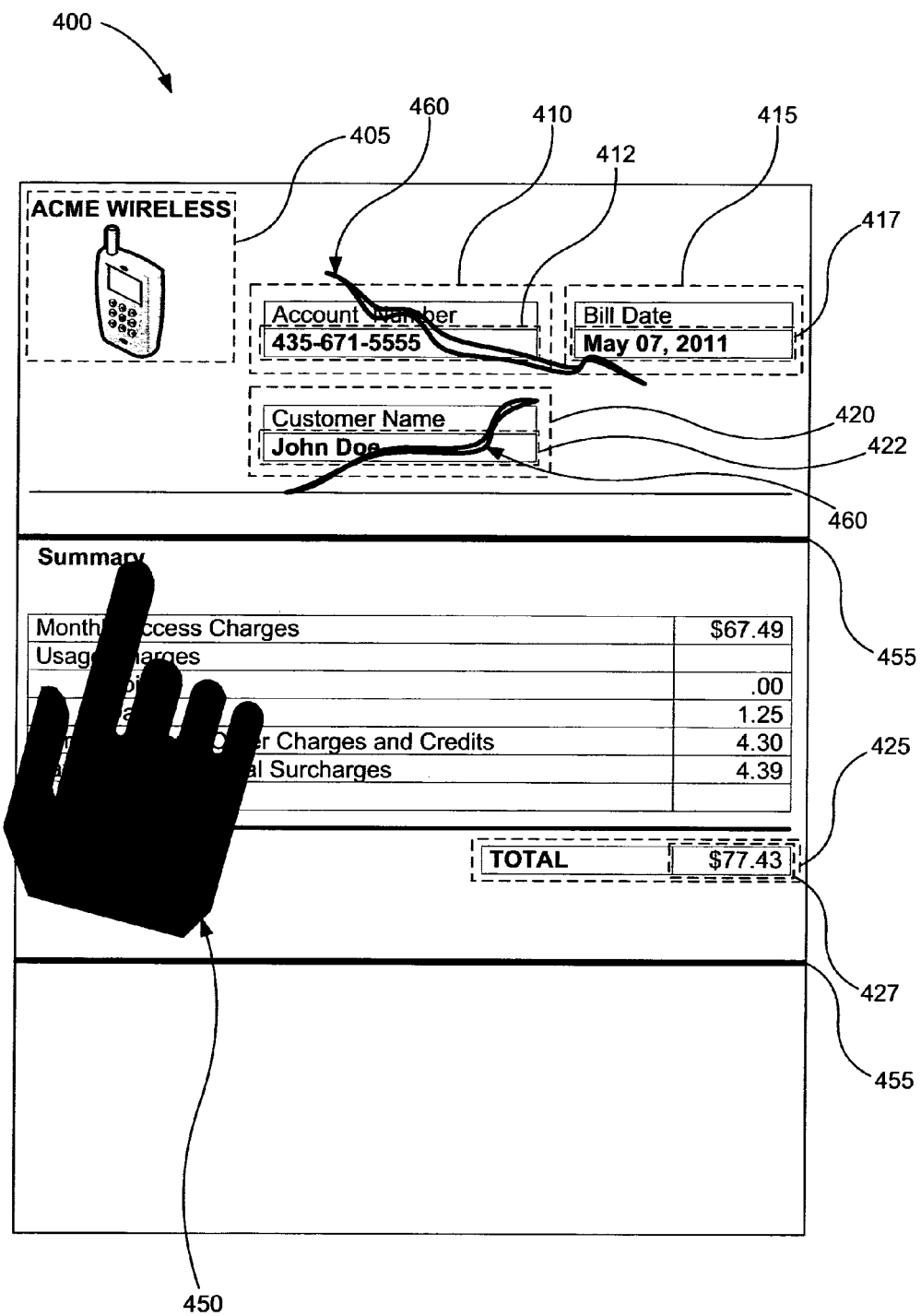
FIG. 4 is a diagram of an illustrative image of a target document, according to one example of the principles described herein.

FIG. 4 is a diagram of an illustrative image of a target document (400), according to one example of the principles described herein. The image of the target document (400) is captured by the image capturing device (110). Data associated with the image of the target document (400) is stored in memory such as, for example, the data storage device (155). The image of the target document (400) comprises target regions of interest (target ROI) (405, 410, 415, 420, 425) from which it is desirable to extract data. These corresponding target ROI correspond to the ROI (305, 310, 315, 320, 325) of the image of the template document (300). As will be discussed in more detail below, the ROI (305, 310, 315, 320, 325) of the image of the template document (300) are mapped with the target ROI (405, 410, 415, 420, 425) of the image of the target document (400).

Further, the image of the target document (400) may also comprise a number of target fields of interest (FOI) (412, 417, 422, 427) corresponding to the FOI (312, 317, 322, 327) of the image of the template document (300) of FIG. 3. In the present example, the target FOI (412, 417, 422, 427) may comprise an account number (412), a bill data (417), a customer name (422), and a total bill amount (427), among others. However, the various target FOI within an image of a target document (400) may include other fields of interest such as, for example, a reservation number, a flight number, a train platform number, a train number, a confirmation number, and a shipped package tracking number, among others.

As described above, the image of the target document (400) as captured by the image capturing device (110) may include noise resultant from imperfections in the target document that was imaged or the environment in which the image of the target document (400) was captured. For example, the image of the target document (400) may include objects that occlude portions of the target document such as, for example, a user's hand (450). In other examples, the image of the target document (400) may also include imperfections such as, for example, fold lines (455) resultant from, for example, placing the target document in an envelope, and wrinkles (460) in the paper resultant from mishandling of the target document. Further, although not depicted, the image of the target document (400) may include non-uniform lighting, perspective distortions, skew, and varying scale and resolution (both with respect to the image of the target document (400) itself and a scanning device). As will now be discussed in more detail, the present specification discloses systems and methods of registering digital images and extracting data there from where the images of the target document (400) contain the above-described noise.

Figure 5:
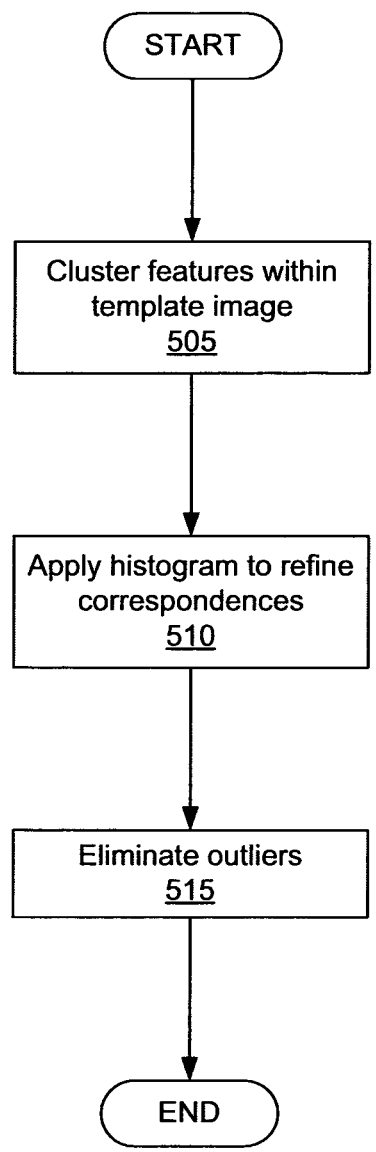
FIG. 5 is a flowchart showing an illustrative document registration method, according to one example of the principles described herein.

Turning to FIG. 5, a flowchart showing an illustrative document registration method, according to one example of the principles described herein, is depicted. The method may begin by clustering (block 505) features within the image of the template document (300). Clustering (block 505) of features within the image of the template document (300) may be accomplished by the processor (150) identifying invariant feature points from the image of the template document (300) and the image of the target image (400) using computer vision methods such as, for example, scale-invariant feature transform (SIFT) or speeded up robust features (SURF). The feature points in the template image (300) and the target image (400) may be referenced by X and Y, respectively. Each invariant feature point has an x,y position within the image and a feature point vector that describes the image in the immediate vicinity of the x,y point. The feature points are created at significant locations within the template image (300) and the target image (400) such as, for example, at locations where there is a sharp intensity change, and locations where color changes occur, among others. Further, the feature vector is an n-dimensional vector of real numbers.

In one example, feature points in the template image (300) are clustered by using k-means clustering. K-means clustering partitions n observations into m clusters in which each observation belongs to the cluster with the nearest mean. Given an initial set of k means $m_1^{(1)}, \ldots, m_k^{(1)}$, which may be specified randomly or by some heuristic, the k-means method proceeds by alternating between assigning each n observation to a cluster with the closest mean and calculate a new means to be the centroid of the observations in the cluster as follows:
Assignment:

$$S_i^{(t)} = \{x_k : \|x_j - m_i^{(t)}\| \leq \|x_j - m_{i^*}^{(t)}\| \text{ for all } i^* = 1, \ldots, k\} \quad \text{Eq. (1)}$$

Update:

$$m_i^{(t+1)} = \frac{1}{|S_i^{(t)}|} \sum_{x_j \in S_i^{(t)}} x_j \quad \text{Eq. (2)}$$

The k-means clustering method converges when the assignments no longer change through a number of iterations. In this manner, Gaussian cluster centers are determined by the feature points within the image of the template document (300), and a plurality of clusters are defined.

For each ROI (305, 310, 315, 320, 325), r, in the template image (300), points belonging to m clusters that are closest to the ROI (305, 310, 315, 320, 325) are selected as the template point set for the ROI ($X_r$). In this manner, the system (100) selects the feature points in the closest clusters. This provides the advantage that the points move closely with the ROI (305, 310, 315, 320, 325), and further reduces the non rigidity among the feature points. Thus, Initial correspondence generation is used by the processor (150) to map points in $X_r$ of the template image (300) onto feature points in Y of the target image (400). In one example, this may be performed using Lowe's SIFT based object recognition. For each $x_i \in X_r$, the two closest points in Y are found by using the Euclidian distance of the feature space. If the ratio of these distances is less than t, the point within the template image (300) with lesser distance is added to the correspondence set:

$$C = \{(x_i, y_j) | x_i \in X_r \text{ and } y_j \in Y\} \quad \text{Eq. (3)}$$

The correspondences now have a many-to-one mapping from X to Y. This correspondence set, C, may be stored in the data storage device (155) for later processing.

For each target point $y_j \in C$, a new correspondence set C' is obtained by performing a reverse mapping. Each point in $y_j \in C$ is mapped onto the points $x_i \in C$. In this manner, correspondences are retained if the obtained mapping is already present in C. This ensures that for each $y_j \in Y$ there exists only one $x_i \in X_r$. Thus, the new correspondences are now:

$$C' = \{(x_i, y_j) | x_i \in X_r, y_j \in Y \text{ and } (x_i, y_j) \in C\} \quad \text{Eq. (4)}$$

The system (100), and, particularly, the processor (150) refines (block 510) the correspondence set C' by eliminating outliers within the correspondences using a histogram of Euclidian distances. The use of the below-described Euclidian histogram increases the probability of convergence of the enhanced RANSAC method described hereafter.

The Euclidean distance between Cartesian coordinates of $x_i$ and $y_j$ for all $(x_i, y_j) \in C'$ is obtained by the processor (150) and placed into histogram bins. Bin size is given by $(\max_{dist} - \min_{dist})/(\text{number of bins})$, where $\max_{dist}$ and $\min_{dist}$ are the maximum and minimum Euclidian distances of the corresponding points $(x_i, y_j) \in C'$, respectively. Correspondences whose Euclidian distances fall in the peak bin and the bins that are within the threshold $t_e$ of the height of the peak bin are selected in a new correspondence set C''. This assumes that while local distortions in document images can be non-planar, these distortions will not grossly alter the relative distribution of corresponding points. Eliminating outliers within the correspondences using a histogram of Euclidian distances improves the convergence rate of iterative processes as will be described in more detail below.

The processor (150) eliminates outliers (block 115) using enhanced random sample consensus (RANSAC) and enhanced thin plate spline-robust point matching (TPS-RPM). These two methods will now be described in more detail below. First, enhanced RANSAC is an iterative process that repeats two phases: (1) generation of hypothesis by randomly sampling the data and (2) hypothesis verification of data. As will be demonstrated below, enhanced RANSAC avoids local minima by validating the registration process.

The correspondence set C'' consists of "inliers" (data whose distribution can be explained by some set of model parameters), and "outliers;" outliers comprising data that do not fit the model. Each RANSAC iteration selects three random, non-collinear points from $x_i \in X$ such that $(x_i, y_j) \in C''$. Using the correspondence between $x_i$ and $y_j$, an affine transformation matrix, M, is determined by the processor (150). The transformation matrix, M, is applied on $\forall x_i | x_i, y_j \in C''$, to obtain $\bar{x}_i$. If $\bar{x}_i \equiv y_j$, then $x_i$ is marked as an inlier; otherwise $x_i$ is marked as an outlier. If the number of inliers in a particular iteration is greater than inliers in a previous iteration, the processor (150) accepts the current set of inliers. In this manner, enhanced RANSAC eliminates outliers arising from locally non-affine distortions. In one example, enhanced RANSAC is terminated after a fixed number of iterations. In another example, enhanced RANSAC terminates when a termination condition is met.

In one example, because specific regions of the template image (300) and corresponding regions of the target image (400) are of interest, processing is limited to the ROI (305, 310, 315, 320, 325), assuming that there are image regions near the ROI that are similar between the target image (400) and the template image (300). In each iteration of the enhanced RANSAC, the transformation matrix M is obtained and used to warp the target image (400) onto the template image (300). In one example, Histogram of gradients (HOG) is computed from image regions surrounding the ROI in the template image (300) and the target image (400). In other examples, various other image features may be considered when analyzing image regions surrounding the ROI in the template image (300) and the target image (400) as discussed below, including, for example, color values, texture values, or other image features of the template image (300) and the target image (400). Further, enhanced RANSAC is performed using the chi-square similarity of the HOG as the matching criterion. A pseudo code representation of outlier elimination using enhanced RANSAC follows:
Input: Set of input correspondences C''; target image (400); m_r number of fixed regions for the registration of ROI (305, 310, 315, 320, 325).
$\text{HOG}_i$: i=1, 2, . . . , m_r, HOG of fixed nearby regions.
$\text{HOG}_{dist}$: maximum positive integer Output: Refined correspondence set C''' with inliers, transformation matrix M.

Initialization: iterations=0; inliers=0; outliers=0; $MAX_{iter}$=maximum number of iterations.

--- while iterations < $MAX_{iter}$ do
    Hypothesis generation: Randomly pick three correspondences between non-collinear points of C''. Determine the transformation matrix $Current_M$ from the three correspondences.
    Hypothesis evaluation: Warp the target image (400) with $Current_M$ to align with the template image (300); Compute HOG of the fixed regions
in
    the warped image $HOG_j$: j = 1, 2, . . . , m_r
    Compute the chi-square distance between $HOG_i$ and $HOG_j$ : i, j = 1, 2, . . . , m_r, average the chi-square distance with m_r, and denote it as $Curr_{dist}$.
    if $Curr_{dist}$ < $HOG_{dist}$ then
        Update:
        $HOG_{dist}$ ← $Curr_{dist}$
        M ← $Current_M$
    end if
end while

---

Update Correspondence set C''' with the correspondences that agree with M. In this manner, the regions of interest (405, 410, 415, 420, 425) within the image of the target document (400) are compared with the regions of interest (305, 310, 315, 320, 325) within the image of the template document (300) to determine if they match. If these ROI do not match exactly, then the position of the regions of interest (405, 410, 415, 420, 425) within the image of the target document (400) are modified, and a determination as to whether they match is again performed.

Second, the processor (150) utilizes an enhanced thin plate spline—robust point matching (TPS-RPM) method to take the correspondence set C'' into account apart from the template point set X, and target point set Y, prevent each template image (300) point being moved towards an irrelevant target image (400) point, and to refine new correspondences with nearby identical correspondences in C''. In one example, each feature point in the clusters derived from the image of the template document (300) and the image of the target document (400) may include a number image features. The image features may comprise, for example, grayscale values of the regions surrounding the clusters, color values of the regions surrounding the feature point, texture values of the regions surrounding the feature points, and combinations thereof. Enhanced TPS-RPM takes these image features into account when eliminating outliers within the correspondence sets.

In enhanced TPS-RPM, let C''=$(x_i, y_j)|x_i \in X_r, y_j \in Y$ be the set of input correspondences computed using the refining (block 510) of the correspondences using the histogram, where $X_r$=$x_i$: i=1, 2, . . . , N and Y=$y_j$: j=1, 2, . . . , M are the template image (300) and target image (400) point sets, respectively. As one-to-one mapping in the correspondence set is enforced, N is equal to M. Let f be an underlying thin-plate spline based non-rigid transformation function, and the transformed template image (300) point set is $X'_r$=$x'_i$=$f(x_i)$: i=1, 2, . . . , N. The processor (150) constructs a correspondence matrix P to store the probabilities of each target image (400) point being assigned to each template image (300) point with dimension (N+1)×(M+1). The correspondence matrix P may be represented as follows:

$$P = \begin{pmatrix} p_{11} & \cdots & p_{1M} & p_{1,M+1} \\ \vdots & \cdots & \vdots & \vdots \\ \vdots & \cdots & \vdots & \vdots \\ \vdots & \cdots & \vdots & \vdots \\ p_{N1} & \cdots & p_{1M} & p_{1,M+1} \\ p_{N+1,1} & \cdots & p_{N+1,M} & 0 \end{pmatrix} \quad \text{Eq. (5)}$$

The inner N×M sub-matrix defines the probabilities of each $x_i$ being assigned to $y_j$. The presence of an extra row and column in the matrix handles outliers in both point sets. The processor (150) determines each $p_{ij}$ as follows:

$$p_{ij} = \frac{1}{T_i} e^{-\frac{(y_j - f(x_i))^T (y_j - f(x_i))}{2T_i}} \quad \text{Eq. (6)}$$

where $T_i$: i=1, 2, . . . , N is the temperature of each template image (300) point cluster. T is kept at maximum throughout the annealing process. When $T_i$ reaches $T_{final}$, the correspondence is approximately binary. If $x_i$ is mapped to $y_j$, then $p_{ij} \approx 1$. Similarly, if $x_i$ is an outlier, then $p_{i,M+1} \approx 1$, and if $y_j$ is an outlier then $p_{N+1,j} \approx 1$. The matrix P satisfies the following row and column normalization conditions.

$$\Sigma_{i=1}^{N+1} p_{ij} = 1, \text{ for } j=1,2,\ldots,M, \text{ and} \quad \text{Eq. (7)}$$

$$\Sigma_{j=1}^{M+1} p_{ij} = 1, \text{ for } i=1,2,\ldots,N \quad \text{Eq. (8)}$$

The processor (150) determines the optimal transformation matrix P' and the optimal transformation function f' that minimizes the energy function E(P,f) as defined in the following equations:

$$[P', f'] = \operatorname{argmin} E(P, f), \quad \text{Eq. (9)}$$

$$E(P, f) = E_g(P, f) + \lambda E_S(f) + E_a(P) \quad \text{Eq. (10)}$$

where $$E_g(P, f) = \sum_{i=1}^{N} \sum_{j=1}^{M} p_{ij} \|y_j - f(x_i)\|^2 \quad \text{Eq. (11)}$$

$$E_S(P, f) = \int\int \left[ \left(\frac{\partial^2 f}{\partial u^2}\right)^2 + \left(\frac{\partial^2 f}{\partial u \partial v}\right)^2 + \left(\frac{\partial^2 f}{\partial v^2}\right)^2 \right] \quad \text{Eq. (12)}$$

$$E_a(P, f) = T \sum_{i=1}^{N} \sum_{j=1}^{M} p_{ij} \log p_{ij} - \zeta \sum_{i=1}^{N} \sum_{j=1}^{M} p_{ij} \quad \text{Eq. (13)}$$

In the above energy function E, $E_g(P,f)$ is the geometric feature-based energy term defined by Euclidean distance. $E_s(P,f)$ is the smoothness energy term with λ being the regularization parameter that controls smoothness of the transformation function. To favor rigid transformations at higher temperatures and local non-rigid transformation at lower temperatures, the framework reduces A using an annealing schedule; $\lambda_i = \lambda_{init} T_i$ where $\lambda_{init}$ is a constant, i=1, 2, . . . , N). $E_a(P,f)$ is a combination of two terms; the first term controls fuzziness of P and the last term prevents too many points being rejected as outliers.

The transformation function $f$ uses thin plate spline (TPS), which can be decomposed into affine and non-affine subspaces, thereby accommodating both rigid and non-rigid transformations.

$$f(x_i,d,w)=x_id+\phi(x_i) \quad \text{Eq. (14)}$$

In instances where $x_i$ is the homogeneous point representation of the 2D point $x_i$, d is a (D+1)×(D+1) affine transformation matrix of the D-dimensional image (for 2D images D=2), and w is an N×(D+1) warping coefficient matrix representing non-affine deformation. $\phi(x_i)$ is the TPS kernel of size 1×(N+1), where each entry $\phi k(x_i)=\|x_k-x_i\|^2 \log\|x_k-x_i\|$.

The pseudo code for the enhanced TPS-RPM may be expressed as follows:
Input: Template image (300) point set $X_r$, target image (400) point set Y, and the correspondence set C''
Output: Correspondence matrix P and transformation f=d, w.
Initialize: Temperature $T_i$: i=1, 2, . . . , N of each template image (300) point cluster with the Euclidean distance between the template image (300) point and the corresponding target image (400) point $y_j$ specified in C'', $T_{final}$ as average of the squared distance between the nearest neighbors of the target image (300) points.
Initialize: smoothness parameter $\lambda_i \leftarrow \lambda_0 T_i$: i=1, 2, . . . , N
Initialize d with identity matrix, P using Eq. 6, and w with a zero matrix.
while max($T_i$)>$T_{final}$ do
    repeat
    Update Correspondence: Compute P using Eq. 6
    Normalize P using Eqs. 7 and 8 iteratively.
    Update transformation: Update w and d using QR decomposition
    until P, d and w converged
    Update $T_i \leftarrow T_{i\gamma}$, update $\lambda_i \leftarrow \lambda_0 T_i$=1, 2, . . . , N; ($\gamma$ is the annealing rate)
end while Further, the enhanced TPS-RPM method described above may be refined because the set of correspondences contains new correspondences which are not in C'', as the set C'' contains correspondences of the dense points. Specifically, the registration parameters obtained in the above enhanced TPS-RPM methods may be refined by minimizing the histogram of gradients error and considering an h by h window around each correspondence.

Figure 6:
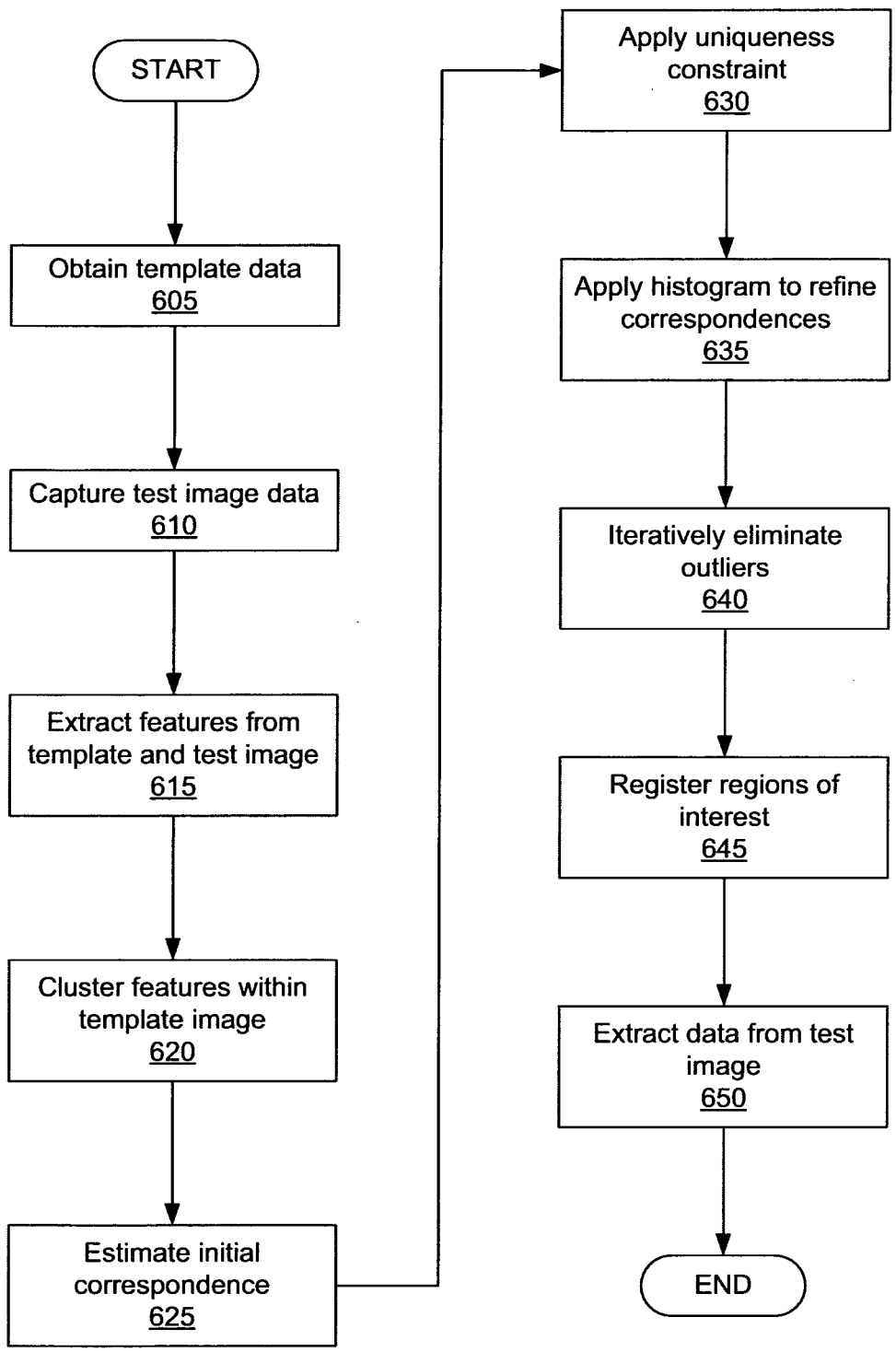
FIG. 6 is a flowchart showing an illustrative document registration method, according to another example of the principles described herein.

FIG. 6 is a flowchart showing an illustrative document registration method, according to another example of the principles described herein. The method of FIG. 6 may begin by obtaining (block 605) data regarding the image of the template document (300). As discussed above, this data may be provided by a goods or services provider, or may be obtained from a digital imaging device (110), among other sources. Once obtained (block 605), the data regarding the image of the template document (300) may be stored in the data storage device (155).

The system (100), and, particularly, the digital imaging device (110) captures (block 610) an image of the target document (400). Once captured (block 610), the image of the target document (400) may be stored in the data storage device (155). The processor (150) extracts (block 615) feature points within the template image (300) and the target image (400). The processor (150) then clusters (620) within the template image (300) and estimates an initial correspondence of feature points between the template image (300) and the target image (400), as described in detail above. A uniqueness constraint may then be applied (block 630).

The processor (150) refines (block 635) the correspondence set C' by eliminating outliers within the correspondences using a histogram of Euclidian distances, as described above. Thereafter, outliers are iteratively eliminated (block 640) using the enhanced RANSAC and enhanced TPS-RPM methods described in detail above. Once the correspondence between the image of the template document (300) and the image of the target document (400) has been determined, the processor (150) registers (block 645) the regions of interest (405, 410, 415, 420, 425) within the image of the target document (400) as compared with the regions of interest (305, 310, 315, 320, 325) within the image of the template document (300). Once regions of interest (405, 410, 415, 420, 425) within the image of the target document (400) are registered (645) and identified, the processor (150) then extracts (block 650) data from the image of the target document (400). Data extraction (block 650) may be performed using, for example, binarization or optical character recognition (OCR).

The extracted data can then be utilized as described above. In one example, the extracted data can be used to auto-populate a fillable form. In this example, the fillable form may be a form available over the network (125) such as, for example, a bill. The extracted data in this example may be an account number and a bill amount that a user may pay via an online payment system associated with the fillable form. In this example, the user captures an image of a bill, and, with the extracted data, pays the bill online.

In another example, the extracted data may be used to confirm a reservation for services provided by a vendor. In this example, image of the target document (400) may be a confirmation receipt, and the data extracted from the image of the target document (400) may be a reservation or confirmation number, a flight number, a railway car and seat number, a date of the reservation, or a name, among other data that would identify the reservation. In this example, the user captures an image of the confirmation receipt, and confirms his or her reservation.

In one example, the above methods are scalable to processing of video of documents. In this example, the digital imaging device (110) captures video images of a template document and a target document, and the video captured by the digital imaging device (110) is analyzed frame by frame in a manner similar to the above methods. Further, in another example, the various methods described above, including clustering of feature points, refining correspondence sets using a histogram of Euclidian distances, eliminating outliers using enhanced RANSAC and enhanced TPS-RPM, may be performed individually, in an isolated manner. In another example, a number of these methods may be performed in combination.

The methods described above may be accomplished in conjunction with a computer program product comprising a computer readable medium having computer usable program code embodied therewith that, when executed, performs the above methods.

The specification and figures describe a method and system for registering a document. Registering a document may comprise clustering of feature points, histogram-based outlier refinement to speed up iterative algorithms like RANSAC and TPS-RPM, enhanced RANSAC for robust registration of document images, and enhanced TPS-RPM with refined correspondences for registration of images under non-rigid deformation.

These methods and system for document registration may have a number of advantages, including the following: 1 Euclidean distance-based histogram eliminates outliers and also enhances the convergence rate of RANSAC; (2) enhanced RANSAC refines the global registration parameters to suit each ROI, accommodating non-affine deformations; (3) enhanced TPS-RPM incorporates image features and leads to better registration of non-rigidly deformed images; (4) overcomes affine transformation in captured images of documents; (5) provides for fewer template document during training; (6) overcomes perspective distortion, lighting variations, and occlusion of target documents; (7) overcomes non-affine local distortions within the target document that may arise from the target document being roughly handled by users; (8) overcomes the lack of similar content between the image of the target document and the image of the template document that may lead other document registration methods to fail on forms that have a small percentage of similar content between target and template images; and (10) overcomes instances where content such as logos and text is repeated at multiple locations within the document causing one area of the template image to be matched with a different location on the target image.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of registering a document comprising:
   with a processor (150), defining (block 505) a plurality of clusters in an image of a template document (300) by assigning each of a number of feature points of an image of a template document to a cluster with the closest mean;
   with the processor (150), refining (block 510) a correspondence set of the feature points between the image of the template document (300) and the image of the target document (400) using a histogram of Euclidian distances; and
   with the processor (150), eliminating (block 515) outliers within a correspondence set of the feature points between the image of the template document (300) and an image of a target document (400) by generating a hypothesis and evaluating the hypothesis a number of iterations,
   in which the image of the target document (400) is captured by an imaging device (110) from a physical document.

2. The method of claim 1, in which refining (block 510) a correspondence set of the feature points between the image of the template document (300) and the image of the target document (400) using a histogram of Euclidian distances comprises:
   determining the Euclidean distance between Cartesian coordinates of a number of feature points within the image of the template document (300) and the image of the target document (400),
   placing the Cartesian coordinates of the feature points within the image of a template document (300) and the image of the target document (400) in a number of bins based on their respective Euclidian distances;
   determining a bin size of each bin by subtracting a minimum Euclidian distance of corresponding feature points from a maximum Euclidian distance of corresponding feature points and dividing the outcome by the total number of bins; and
   determining a new correspondence set of feature points by selecting corresponding feature points that fall in a bin that is within a threshold of a bin with the maximum Euclidian distance of corresponding feature points.

3. The method of claim 1, further comprising, with the processor, eliminating (block 515) outliers within a correspondence set of the feature points between the image of the template document (300) and the image of the target document (400) by alternately estimating a number of correspondences between feature points of the image of the target document (400) and feature points of the image of the template document (300), and determining a transformation function;
   in which estimating a number of correspondences between feature points of the image of the template document (300) and feature points of the image of the target document (400) comprises estimating a number of correspondences between image features of the feature points within the image of the template document (300) and corresponding feature points of the image of the target document (400), and
   in which the image features are derived from the plurality of feature points in the image of the template document (300).

4. The method of claim 3, in which the image features comprise grayscale values of the regions surrounding the clusters, color values of the regions surrounding the clusters, texture values of the regions surrounding the clusters, or combinations thereof.

5. The method of claim 1, in which the imaging device (110) comprises a digital imaging device communicatively coupled to a mobile phone, a digital imaging device communicatively coupled to a smart phone, a webcam, an office camera, a digital camera, or a handheld scanning device.

6. The method of claim 1, in which the method is performed for a number of frames within a video stream.

7. The method of claim 1, further comprising:
   registering (block 645) regions of interest within the image of the target document (400);
   extracting (block 650) data from the image of the target document, and
   utilizing the extracted data to auto-populate a fillable form.

8. The method of claim 1, further comprising:
   registering (block 645) regions of interest within the image of the target document (400);
   extracting (block 650) data from the image of the target document, and
   utilizing the extracted data to providing additional information to a user associated with the extracted data.

9. A system (100) for registering a document comprising:
   a digital imaging device (110) that captures an image of a target document (400);
   a data storage device (155) communicatively coupled to the digital imaging device (110) that stores the image of the target document (400) and an image of a template document (300); and
   a processor (150) communicatively coupled to the data storage device (155) that:
   defines a plurality of clusters in the image of the template document (300), each cluster comprising a number of feature points within the image of the template document, by assigning each feature point to a cluster with the closest mean; and
   eliminates outliers within a correspondence set of the feature points between the image of the template document (300) and the image of the target document (400) by generating a hypothesis and evaluating the hypothesis a number of iterations.

10. The system of claim 9, in which the processor further refines (block 510) a correspondence set of the feature points between the image of the template document (300) and the image of the target document (400) using a histogram of Euclidian distances.

11. The system of claim 9, in which the processor further eliminates outliers within a correspondence set of the feature points between the image of the template document (300) and the image of the target document (400) using image features of the target document from which the image of the target document (400) is captured.

12. The system of claim 11, in which the image features comprise grayscale values of the regions surrounding the clusters, color values of the regions surrounding the clusters, texture values of the regions surrounding the clusters, or combinations thereof.

13. A computer program product for registering a document, the computer program product comprising:
- a non-transitory computer readable medium having computer usable program code embodied therewith, the computer usable program code comprising:
  - computer usable program code that, when executed by a processor, defines (block 505) a plurality of clusters in an image of a template document (300) by assigning each of a number of feature points of an image of a template document to a cluster with the closest mean; and
  - computer usable program code that, when executed by the processor, refines (block 510) a correspondence set of the feature points between the image of the template document (300) and an image of a target document (400) by:
    - determining the Euclidean distance between Cartesian coordinates of the feature points within the image of the template document (300) and the image of the target document (400),
    - placing the Cartesian coordinates of the feature points within the image of a template document (300) and the image of the target document (400) in a number of bins based on their respective Euclidian distances;
    - determining a bin size of each bin by subtracting a minimum Euclidian distance of corresponding feature points from a maximum Euclidian distance of corresponding feature points and dividing the outcome by the total number of bins; and
    - determining a new correspondence set of feature points by selecting corresponding feature points that fall in a bin that is within a threshold of a bin with the maximum Euclidian distance of corresponding feature points.

14. The computer program product of claim 13, further comprising computer usable program code that, when executed by the processor, eliminates (block 515) outliers within a correspondence set of the feature points between the image of the template document (300) and the image of the target document (400) by generating a hypothesis and evaluating the hypothesis a number of iterations.

15. The computer program product of claim 13, further comprising computer usable program code that, when executed by the processor, eliminates (block 515) outliers within a correspondence set of the feature points between the image of the template document (300) and the image of the target document (400) by:
- alternately estimating a number of correspondences between feature points of the image of the template document (300) and feature points of the image of the target document (400), and determining a transformation function;
- in which estimating a number of correspondences between feature points of the image of the template document (300) and feature points of the image of the target document (400) comprises estimating a number of correspondences between image features within the image of the template document (300) and corresponding regions of the image of the target document (400), and
- in which the image features are derived from the plurality of clusters in the image of the template document (300).

\* \* \* \* \*